INVENTORS
RICHARD WHATHAM
OSKAR A. MORGENSTERN

ATTORNEYS.

United States Patent Office 3,236,102
Patented Feb. 22, 1966

3,236,102
TEMPERATURE COMPENSATING CISTERN-
TYPE BAROMETERS
Richard Whatham, Huntington, and Oskar A. Morgenstern, Lindenhurst, N.Y., assignors to Henry J. Green Instruments, Inc., Westbury, N.Y., a corporation of New York
Filed Aug. 28, 1962, Ser. No. 219,882
2 Claims. (Cl. 73—385)

This invention relates to an improved digital readout barometer, and in particular, relates to improved temperature compensation means for such a barometer.

The invention has particular application to a barometer of the general type including a vertical tube containing a mercury column, the height of which varies according to changes in ambient pressure. A differential transformer is slidably mounted upon the tube and has a pair of input windings connected in series and a pair of output windings connected in opposition to each other in an electric circuit. An appropriate input voltage is supplied to the transformer. The barometer system also includes a float in the tube on the mercury column and a transformer core on the float in operative relationship to the transformer. The outputs of the transformer are connected into an appropriate electric circuit which produces an output in accordance with the differential of the output of the transformer secondaries, and this output drives a servo motor which is mechanically coupled to the transformer. When the float is out of null position relative to the transformer, so as to result in a differential output thereof, the motor is actuated so as to move the transformer into position so as to restore the null value of the output voltage thereof. In this way, the transformer rises and falls in accordance with changes in atmospheric pressure which cause corresponding changes in the mercury level in the barometer tube. The drive system for the transformer is coupled to any suitable digital readout device.

While the above-described system is relatively accurate, it will be apparent that since mercury expands and contracts with changes in temperature, thereby changing the level of the mercury column in the barometer, this can cause a change in the apparent pressure reading.

An important object of this invention is to provide temperature compensation means which automatically change the digital readout to compensate for changes in temperature, so that a true pressure reading is obtained.

Another object of this invention is to provide such temperature compensation means which are accurate under a variety of conditions, which are easily calibrated and which have a minimum of moving parts.

In accordance with a preferred embodiment of the invention, the temperature compensation means include a second vertical tube of the same diameter as the barometer tube, the second tube being a thermometer tube and containing a mercury column of the same general height as the height of the column in the barometer tube. The mercury column in the thermometer tube is subject to changes in height according to changes in ambient temperature but not according to changes in pressure. A second differential transformer substantially similar to the first differential transformer is fixedly mounted upon the thermometer tube. A similar float carrying a similar transformer core is located in the thermometer tube riding upon the mercury column therein. The secondaries of the two differential transformers are connected in common circuit.

At the pre-set temperature, the secondaries of the thermometer tube transformer present a null reading and the movement of the barometer transformer is entirely controlled by pressure changes. If the temperature changes from the pre-set value, then the corresponding change in the mercury level of the barometer tube causes change in the position of the barometer tube transformer. However, the float in the thermometer tube correspondingly changes position, causing a differential output voltage to be produced in the secondary of the thermometer tube transformer and fed to the common output circuit, this change in voltage causing a compensating movement of the barometer tube transformer so as to produce an opposing differential output voltage in said transformer. The two movements of the barometer tube transformer cancel each other out, so that the readout counter continues to indicate true pressure.

The advantage of the system is that the output voltages of the two transformers are of the same type and vary proportionately in much the same way, making it easy to introduce calibration means into the common output circuit. Furthermore, it is possible to introduce simple electromechanical compensation means introducing a proportionality factor so that the temperature compensation factor is proportional to the actual pressure.

Other objects and advantages of the invention will become apparent from the following description, in conjunction with the annexed drawings, in which preferred embodiments of the invention are disclosed.

Figure 1:
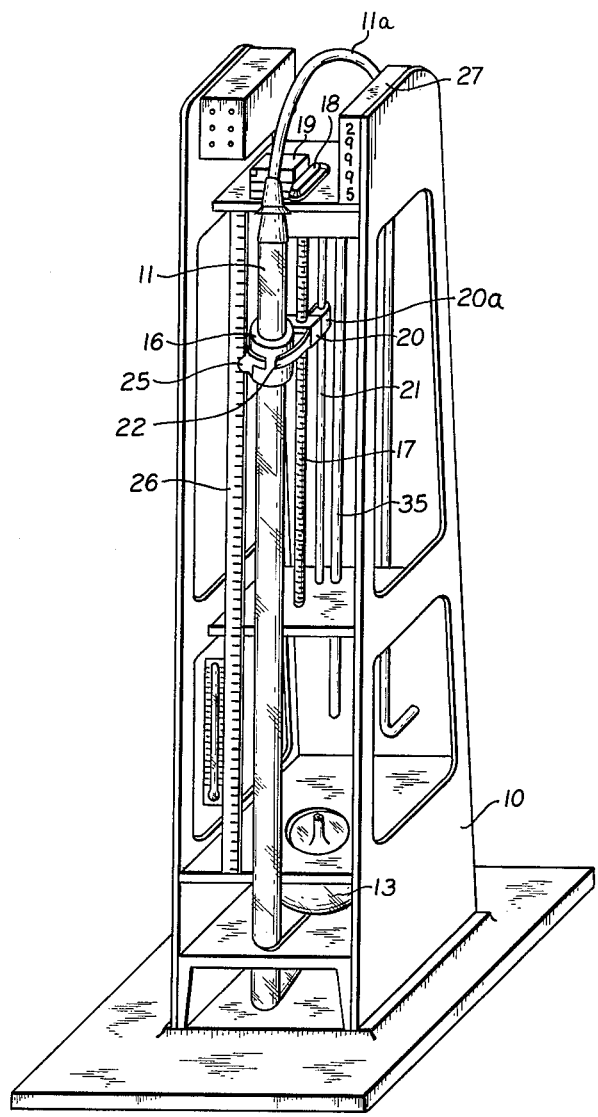
FIG. 1 is a perspective view of a temperature-compensated digital readout mercury barometer in accordance with this invention.

Upon reference to the drawings in detail, it will be noted that it shows a frame 10 which supports a vertically extending barometer tube 11 with a connection 12 at its lower end to a conventional cistern 13. The upper end of tube 11 is connected to a hose (omitted in FIG. 2) which may be connected to any suitable evacuation apparatus (not shown) for evacuating air above the mercury column in tube 11 in the direction of arrow 11b. Tube 11 contains a mercury column 14 having an upper level 14a and also extending into the cistern 13 having an upper level 14b therein, cistern 13 being open at its top to the atmosphere and the difference between mercury levels corresponding to the atmospheric pressure in the usual way.

Differential transformer 16 is mounted on a tubular sleeve which extends axially slidably around tube 11. Vertical screw 17 is mounted adjacent and parallel to tube 11, by any suitable means so as to be turnable. The upper end of screw 17 is connected through gear box 18 to the output of servo motor 19, both of these elements being mounted upon frame 10. Screw follower 20 is mounted upon screw 17 so as to rise and fall by turning of screw 17, a vertical guide rod 21 being journaled in an extension 20a of follower 20. Rod 21 is fixedly supported by frame 10. Any suitable bracket means 22 is employed to fix transformer 16 to follower 20. As a result, operation of servo motor 19 causes transformer 16 correspondingly to rise or fall upon tube 11.

A non-magnetic float 23 floats upon the upper surface or meniscus 14a of mercury column 14. Float 23 comprises upper guide 23a and lower guide 23b which fit slidably and frictionally within the bore of tube 11. Float 23 also comprises hollow, open-ended glass tube 23c connecting guides 23a and 23b, the upper and lower ends of the tube 23c being appropriately embedded in the respective guides. An elongated ferromagnetic transformer core 24 is positioned coaxially and peripherally clearingly within tube 23c. Core 24 rests upon guide 23b and clears guide 23a. Core 24 has a screw-threaded shank 24a which extends through and below guide 23b. Weight 23d is screwed upon shank 24a in abutment with the bottom of guide 23b. This construction keeps core 24 precisely in axial alignment with transformer 16.

As will be apparent from the following description, changes in the position of core 24 relative to transformer 16 resulting from changes in height of mercury column 14 cause corresponding compensating changes in position of transformer 16, and this in turn indicates the measured barometric pressure. The readout may be accomplished by determining visually the position of pointer 25 on the outside of transformer 16 against a vertical scale 26 mounted on frame 10, which scale 26 may be graduated in appropriate units of linear measurement. However, for greater accuracy, a readout counter 27 is fixed to frame 10 and coupled to gear box 18, the counter 27 being adapted to give the pressure in thousandths of an inch or other appropriate unit of linear measurement corresponding to the position of transformer 16. Thus, illustratively, in the drawing, counter 27 gives a pressure reading of 29.995 inches.

Figure 2:
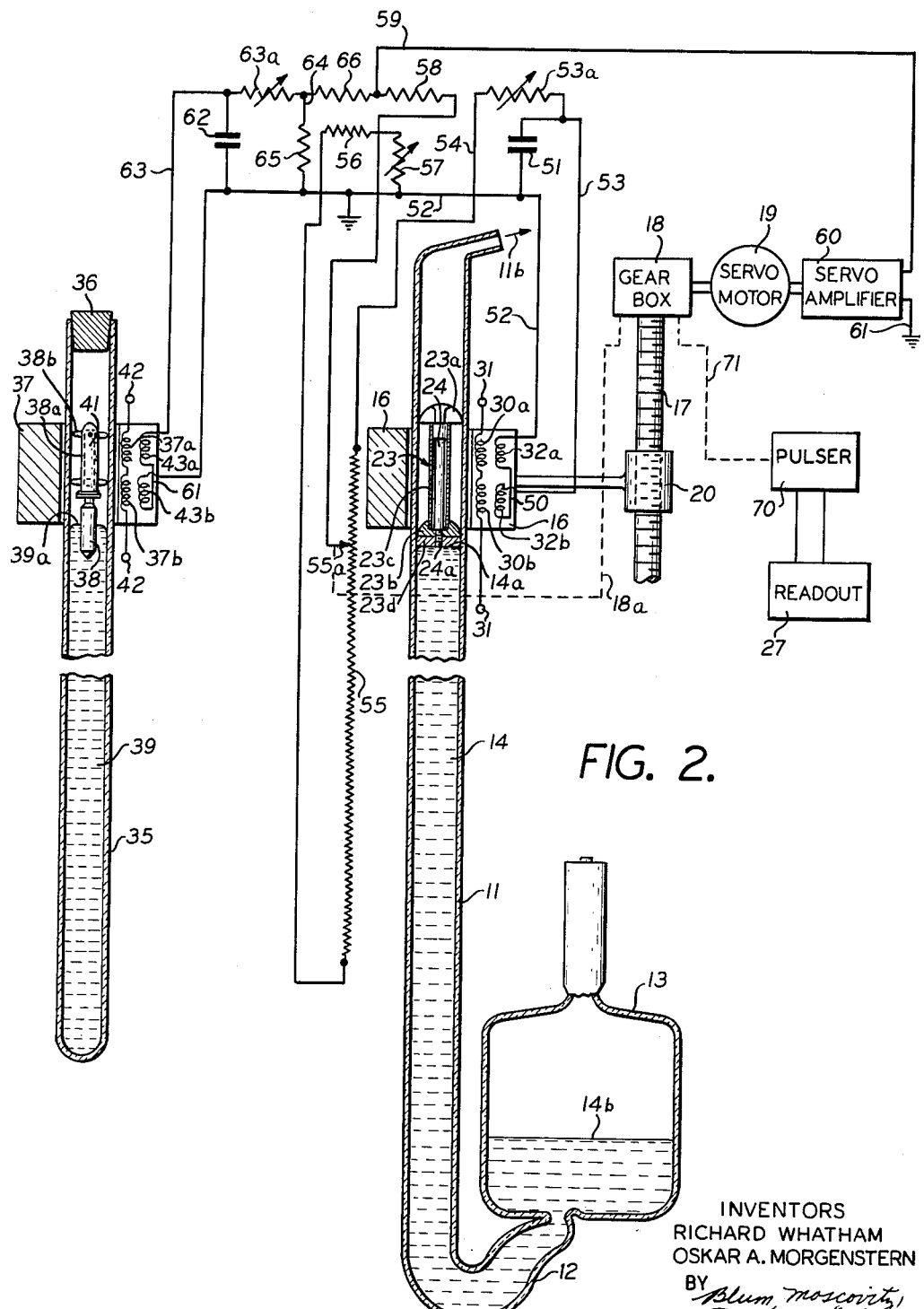
FIG. 2 is a diagrammatic view of the temperature-compensated digital readout mercury barometer in accordance with this invention.

Also in accordance with known practice, transformer 16 has two primary coil windings 30a and 30b located symmetrically one above the other, as shown diagrammatrically in FIG. 2, and connected in series addition between terminals 31 which are adapted to be connected to any source of appropriate alternating current (not shown). The coil windings 30a and 30b are opposed by respective secondary coil windings 32a and 32b.

Thermometer tube 35 is located in vertical position, parallel to tube 11. Preferably, tube 35 extends from near the bottom to near the top of tube 11. Tube 35 is integrally closed at its lower end and is provided with a stopper 36 at its open upper end. Tube 35 is of the same diameter as tube 11 and contains a column of mercury 39.

Differential transformer 37 is mounted upon a tubular sleeve which extends around tube 35 and which is fixed thereto by any suitable means. A non-magnetic float 38 floats upon the upper surface or meniscus 39a of mercury column 39. The upper surface of float 38 carries an elongated axially extending ferro-magnetic transformer core 41. Core 41 is surrounded by glass shield 38a, said shield having projections 38b which frictionally engage the wall of tube 35. At reference temperature, the core 41 may be axially centered with respect to differential transformer 37, so as to produce a null readout thereof. Changes in the position of core 41 relative to transformer 37 resulting from changes in height of mercury column 39, caused by changes in temperature thereof, cause change in the output voltage of differential transformer 37.

Differential transformer 37 and core 41 preferably correspond in physical dimensions and in coil characteristics to transformer 16. Transformer 37 has two primary coil windings 37a and 37b located symmetrically one above the other, as shown diagrammatically in FIG. 2, and connected in series addition between terminals 42 which are adapted to be connected to any source of appropriate alternating current (not shown). The coil windings 37a and 37b are opposed by respective secondary coil windings 43a and 43b.

The respective coils 32a and 32b, and 43a and 43b, are connected in a common electric circuit which is coupled to servo motor 19 so as to produce appropriate action of motor 19 in response to changes in level of the respective mercury columns 14 and 39. Specifically, the coils 32a and 32b are connected in series opposition, their lower ends being connected by line 50. Capacitor 51 is connected across the opposing coils 32a and 32b by means of grounded line 52 and line 53 which connect between the respective sides of capacitor 51 and the respective upper ends of coils 32a and 32b. Line 53 is connected by adjusting variable resistor 53a and line 54 to the upper end of potentiometer resistance coil 55.

Potentiometer coil 55 is omitted in FIG. 1 but is shown in FIG. 2. Coil 55 serves as a proportionality resistance and extends in parallel relationship to tube 11 so as to cover physically the full range of positions of mercury level 14a corresponding to the full range of pressure to be encountered. The lower end of coil 55 is connected by resistance 56 and adjusting variable resistance 57 to grounded line 52.

The adjustable contact 55a of potentiometer coil 55 is connected by resistance 58 to line 59, which is in turn connected to one input terminal of conventional phase-sensitive servo amplifier 60, the other terminal of which is grounded at 61. Servo amplifier 60 is coupled to servo motor 19. When, as a result of change in ambient pressure, core 24 is moved off center relative to transformer 16, the opposing coils 32a and 32b produce a resultant output signal between line 59 and ground, the phase of which depends upon the direction of movement of core 24. Servo amplifier 60 produces a corresponding output, so that servo motor 19 drives screw 17 in direction to move transformer 16 to reduce the signal between line 59 and ground to null value.

Contact 55a is mechanically coupled to gear box 18, as indicated by broken line 18a, so as to move in unison with transformer 16 and thereby remain always at the level of mercury meniscus 14a.

Coils 43a and 43b are connected in series opposition, their lower ends being connected by line 61. Capacitor 62 is connected across the opposing coils 43a and 43b by means of the aforesaid grounded line 52 and line 63 which connect between the respective sides of capacitor 62 and the respective upper ends of coils 43a and 43b. Line 63 is connected by adjusting variable resistor 63a and line 64 to one terminal of resistance 65, the other terminal of which is connected to grounded line 52. Line 64 is also connected by resistance 66, which optionally matches resistance 58, to line 59.

When, as a result of change in ambient temperature, core 41 is moved off center relative to transformer 37, the opposing coils 43a and 43b produce a resultant signal between contact 55a and ground, the phase of which depends upon the direction of movement core 41.

In a working model, resistances 53a and 53a each had a maximum value of 1,000 ohms. The value of resistance 65 was 25,000 ohms; resistance 55, 10,000 ohms maximum; resistance 56, 15,000 ohms; resistance 57, 5,000 ohms maximum.

As is also shown diagrammatically in FIG. 2, the coupling of digital readout device 27 to gear box 18 is by means of pulser 70. Pulser 70 may have any conventional electro-mechanical design and may be mechanically coupled, as indicated at 71, to gear box 18. By way of example, one revolution of screw 17 may correspond to a pressure change of 1 millibar of mercury and may produce ten pulses of pulser 70. Pulser 70 is conventionally coupled to device 27 and produces an 0.001 change in reading thereof per pulse.

The operation of the device is extremely simple. If there is a change in pressure, core 41 is substantially unaffected; but core 24 is moved, resulting in establishment of a signal voltage drop between line 59 and ground. Servo motor 19 acts to move transformer 16 to reduce the signal to null. If there is a change in temperature, the height of each mercury column changes, and core 24 again moves, producing a signal voltage drop between line 59 and ground. However, core 41 also moves, in the same direction as core 24, with resulting opposing or compensating signal voltage drop between contact 55a and ground. The proportionality factor thus introduced depends in magnitude upon the height of mercury column 14 (in other words upon ambient pressure), since the position of contact 55a corresponds to the level of meniscus 14a. The signal difference, which is extremely small, controls the movement of transformer 16. Put in other terms, the tendency of transformer 16 to move, as the result of movement of core 24, is substantially prevented by the temperature compensation when the core movement is the result of temperature change; and the pressure reading is substantially unchanged. At low pressure, the movement of core 24 per unit of temperature change is less than at high pressure; but at the same time, the temperature compensation factor from the relatively constant height mercury column 39 is reduced because of the lower position of contact 55a. Correspondingly, at high pressure, the temperature compensation factor is increased.

It will be apparent from the foregoing that in a very simple device, with a minimum of additional moving parts, it is possible to modify the digital reading barometer so as to introduce accurate temperature compensation.

While a preferred embodiment of the invention has been disclosed, and various possible changes, omissions and additions have been indicated therein, it will be apparent that various other changes, omissions and additions may be made in the invention without departing from the scope and spirit thereof.

What is claimed is:

1. Temperature-compensated barometer system comprising a vertical barometer tube and a vertical thermometer tube of the same diameter, mercury columns of the same general height in each tube subject to generally corresponding height changes according to change in ambient temperature, barometric means causing the barometer tube column to vary in height according to changes in ambient pressure, a pair of hollow differential transformers each having primary coil means and secondary coil means, means mounting a first transformer vertically movably on said barometer tube, means mounting the second transformer fixedly on said thermometer tube, means for supplying input voltage to said primary coil means, a float in each tube on the mercury column therein, a vertically elongated transformer core on each said float in operative relationship to the transformer associated with the tube containing said float, an elongated potentiometer coil of length corresponding to the range of movement of the upper level of the mercury column in the barometer tube in accordance with changes in ambient pressure, a movable contact operatively associated with said potentiometer coil circuit means connecting said potentiometer coil across the secondary coil means of the transformer associated with said barometer tube, a phase sensitive servo amplifier having input terminals, a servo motor operatively coupled to said servo amplifier for operation in response to input signals to said servo amplifier, means operatively coupling said servo motor to said barometer tube transformer and to said movable contact, circuit means connecting the secondary coil means of the transformer associated with the thermometer and said movable contact and one end of said potentiometer coil in phase opposing relationship across said amplifier input terminals, each said transformer having a null position relative to its associated transformer core wherein it has a null output signal, each said transformer producing an output whose phase is dependent upon the direction of movement of the associated transformer core as the result of movement of said associated transformer core in response to change in height of the associated mercury column, the circuit connections being such that the signal between the ends of said potentiometer coil resulting from change of position of the barometer tube float responsive to temperature changes is cancelled by the corresponding signal from the secondary of the temperature tube transformer in proportion to the position of said movable contact on said potentiometer coil, said servo motor being operative in response to a signal of the secondary of said barometer tube transformer in response to change in pressure and not being operative in response to the resultant signal of said secondaries as the result of change in ambient temperature to move said barometer tube transformer in the direction to restore null signal upon the input of said servo amplifier, the vertical position of said barometer tube transformer thereby varying in accordance with changes in ambient temperature.

2. Temperature-compensated barometer system comprising a vertical barometer tube, a mercury column in said tube subject to height changes according to change in ambient temperature, barometric means causing the barometer tube column to vary in height according to changes in ambient temperature, a pair of hollow differential transformers each having primary coil means and secondary coil means, means mounting a first transformer vertically movably on said barometer tube, means for supplying input voltage to said primary coil means, a float in said barometer tube on the mercury column therein, a vertically elongated transformer core on said float in operative relationship to said first transformer, a second transformer core in said second transformer, means moving said second transformer core in its associated transformer in the direction of length thereof in accordance with changes in ambient temperature, an elongated potentiometer coil of length corresponding to the range of movement of the upper level of the mercury column in the barometer tube in accordance with changes in ambient pressure, a movable contact operatively associated with said potentiometer coil, circuit means connecting said potentiometer coil across the secondary coil means of the transformer associated with said barometer tube, a phase sensitive servo amplifier having input terminals, a servo motor operatively coupled to said servo amplifier for operation in response to input signals to said servo amplifier, means operatively coupling said servo motor to said barometer tube transformer and to said movable contact, circuit means connecting the secondary coil means of said second transformer and said movable contact and one end of said potentiometer coil in phase opposing relationship across said amplifier input terminals, each said transformer having a null position relative to its associated transformer core wherein it has a null output signal, each said transformer producing an output whose phase is dependent upon the direction of movement of the associated transformer core as the result of movement of said associated transformer core in response to change in ambient temperature, the circuit connections being such that the signal between the ends of said potentiometer core resulting from change of position of the barometer tube float responsive to temperature changes is canceled by the corresponding signal from the secondary of the second transformer in proportion to the position of said movable contact on said potentiometer coil, said servo motor being operative in response to a signal of the secondary of said first transformer in response to change of pressure and not being operative in response to the resultant signal of said secondaries as the result of change in ambient temperature to move said barometer tube transformer in the direction to restore null signal upon the input of said servo amplifier, the vertical position of said barometer tube transformer thereby varying in accordance with changes in ambient temperature.

References Cited by the Examiner

UNITED STATES PATENTS

| | | | |
|---|---|---|---|
| 1,922,882 | 8/1933 | Chatfield | 73—393 |
| 3,043,144 | 7/1962 | Glassey | 73—401 |

OTHER REFERENCES

Exacted Servomanometers, Bulletin 500, Exacted Instrument Co., Los Altos, California, 1957.

LOUIS R. PRINCE, *Primary Examiner.*

RICHARD QUEISSER, *Examiner.*